United States Patent
Chen

[11] Patent Number: 5,866,860
[45] Date of Patent: Feb. 2, 1999

[54] MUFFLER HAVING A PRESSURE ADJUSTING DEVICE

[76] Inventor: Ching Long Chen, 1F., No. 210, Sec. 5, Han Kou Road, Taichung, Taiwan

[21] Appl. No.: 984,969

[22] Filed: Dec. 4, 1997

[30] Foreign Application Priority Data

Dec. 6, 1996 [TW] Taiwan ................................ 85218870

[51] Int. Cl.$^6$ ...................................................... F01N 7/18
[52] U.S. Cl. ............................................ 181/237; 181/241
[58] Field of Search ................................. 181/237, 241, 181/243, 256, 258, 254, 271; 55/276, DIG. 30; 60/299, 302

[56] References Cited

U.S. PATENT DOCUMENTS

| | | | |
|---|---|---|---|
| 3,253,676 | 5/1966 | Bottum | 181/241 |
| 3,680,659 | 8/1972 | Kasten | 181/237 |
| 3,715,010 | 2/1973 | Gibel | 181/237 |
| 4,134,772 | 1/1979 | Trainor | 181/258 |
| 4,318,720 | 3/1982 | Hoggatt | 55/276 |

*Primary Examiner*—Khanh Dang

[57] ABSTRACT

A muffler includes a housing and one or more tubes secured in the housing. A valve member is engaged in each of the tubes for adjusting an opening size of the tube and for adjusting the pressure that may be generated in the housing such that the mufflers may be secured to various kinds of engines. The valve member includes a ball rotatably engaged in the tube and having an orifice for adjusting the opening size of the bore when the ball is rotated. A filter material is engaged in the housing and may be squeezed for adjusting the output noise of the muffler.

8 Claims, 4 Drawing Sheets

MUFFLER HAVING A PRESSURE ADJUSTING DEVICE

BACKGROUND OF THE INVENTION

1. Field of the Invention

The present invention relates to a muffler, and more particularly to a muffler having a pressure adjusting device.

2. Description of the Prior Art

Typical mufflers comprise a housing having one or more manifolds secured in the housing. A great pressure may be generated within the housing. Different mufflers may have different pressures. However, none of the prior mufflers may be adjusted to different pressure such that the efficiency of the engine may not be adjusted.

The present invention has arisen to mitigate and/or obviate the afore-described disadvantages of the conventional mufflers.

SUMMARY OF THE INVENTION

The primary objective of the present invention is to provide a muffler which includes a device for adjusting the pressure in the muffler.

The other objective of the present invention is to provide a muffler which includes a device for adjusting the noise that may be generated by the muffler.

In accordance with one aspect of the invention, there is provided a muffler comprising a housing, at least one tube secured in the housing and having a bore, and at least one valve member engaged in the tube for adjusting an opening size of the bore of the tube and for adjusting the pressure that may be generated in the housing and for allowing the muffler to be adjusted to different pressures according to the characteristics of different engines.

The valve member includes a ball rotatably engaged in the tube and having an orifice for aligning with the bore of the tube and for adjusting the opening size of the bore when the ball is rotated. The valve member includes a shaft extended from the ball and a hand grip secured on the shaft for rotating the ball. A first cylindrical filter is secured in the housing, a second cylindrical filter is secured in the housing and located between the housing and the first cylindrical filter, a filter material is engaged between the first and the second cylindrical filters, and means for squeezing the filter material. The filter material is a spongy material having a slot for engaging with the shaft of the valve member.

In accordance with another aspect of the invention, there is provided a muffler comprising a housing, a first cylindrical filter secured in the housing, a second cylindrical filter secured in the housing and located between the housing and the first cylindrical filter, a filter material engaged between the first and the second cylindrical filters, and means for squeezing the filter material.

The squeezing means includes a ring slidably engaged between the first and the second cylindrical filters, and means for moving the ring against the filter material and for squeezing the filter material. The moving means includes at least one bolt threadedly engaged in the housing and threadedly engaged with the ring for allowing the bolt to move the ring against the filter material. The filter material includes at least one aperture for engaging with the bolt.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
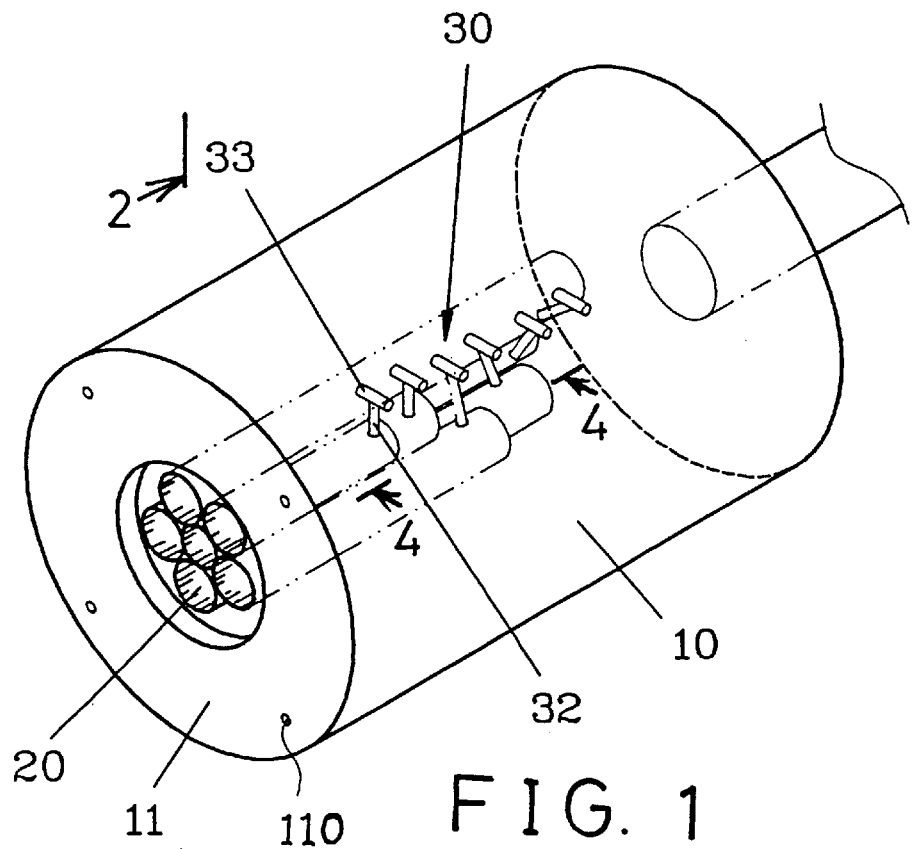
FIG. 1 is a perspective view of a muffler in accordance with the present invention.

Referring to the drawings, and initially to FIGS. 1–4, a muffler in accordance with the present invention comprises a housing 10 and one or more tubes 20 secured in the housing 10 and arranged parallel to each other. The number of the tubes 20 equal to the number of the cylinders of the engine. For example, for an engine having six cylinders, the housing 10 preferably includes six tubes 20 secured in the housing 10. The tubes 20 include different lengths and each includes a valve device 30 for adjusting the opening size of the tube 20.

Figure 3:
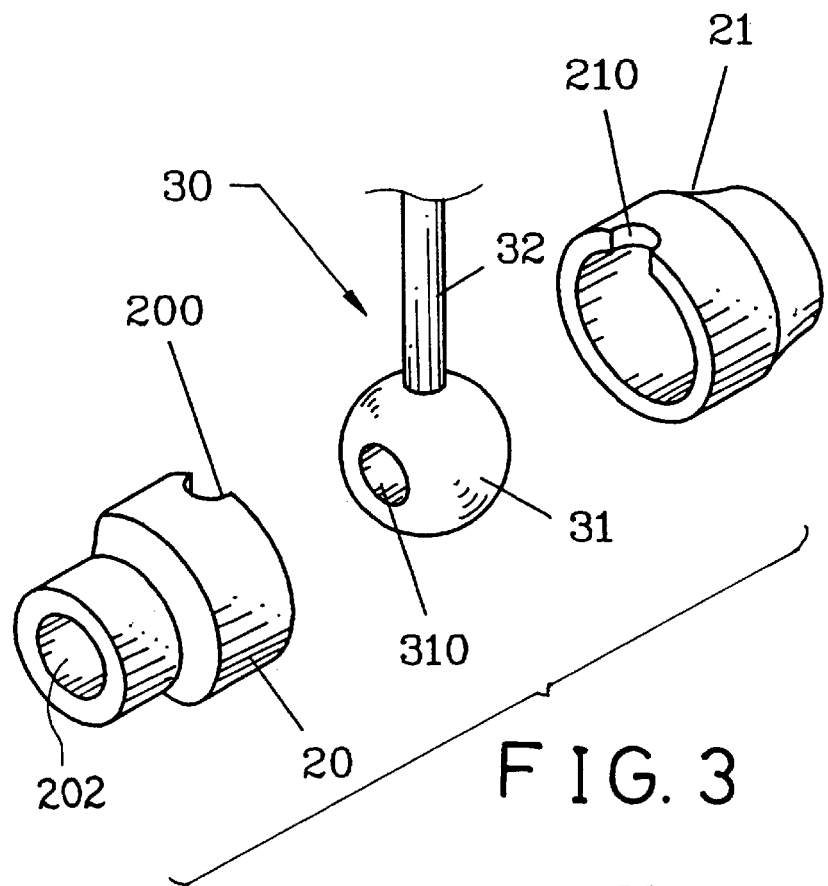
FIG. 3 is a partial exploded view of a valve.
Figure 4:
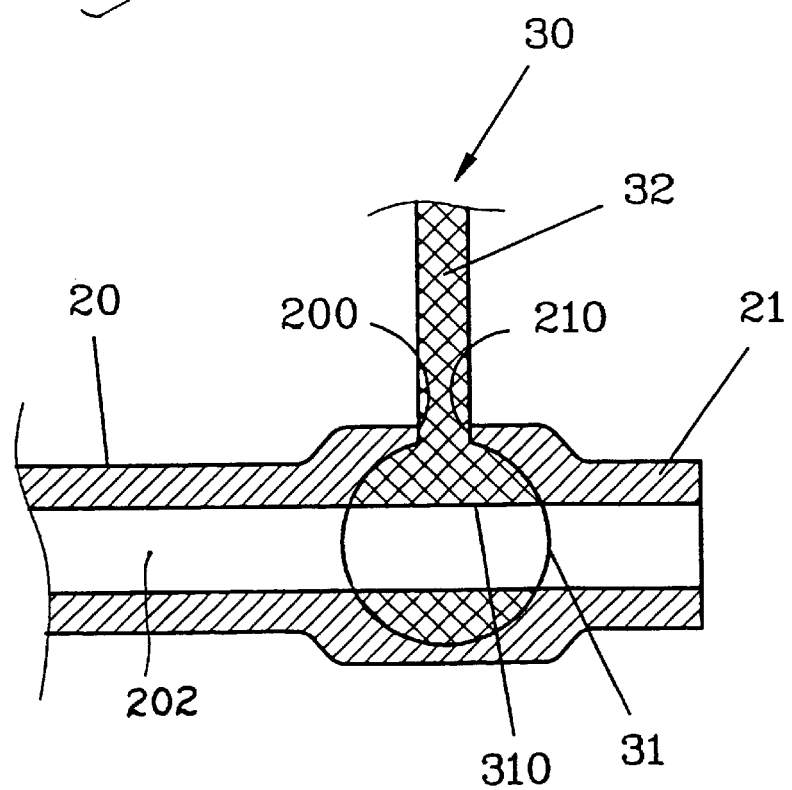
FIG. 4 is a partial cross sectional view taken along lines 4—4 of FIG. 1.

As best shown in FIGS. 3 and 4, the valve device 30 includes a ball 31 engaged in the tube 20 and a shaft 32 extended from the ball 31 and extended outward of the tube 20. The ball 31 includes an orifice 310 for aligning with the bore 202 of the tube 20. The shaft 32 includes a hand grip 33 secured on top of the shaft 32 for rotating the ball 31 about the shaft 32 and for allowing the ball 31 to adjust the opening size of the bore 202 of the tube 20. The tube 20 may include a stud 21 secured, such as welded, to the end portion of the tube 20 for rotatably securing the ball 31 within the tube 20. The tube 20 and the stud 21 each includes a semi-cirrular recess 200, 210 for engaging with the shaft 32 and for allowing the ball 31 to be rotated about the shaft 32. The bore 202 of the tube 20 may be completely blocked when the orifice 310 of the ball 31 is rotated to the position perpendicular to the bore 202 of the tube 20.

When the muffler is coupled to an engine, the balls 31 may be easily rotated in order to adjust the opening sizes of the tubes 20. The pressure that may be generated in the housing 10 may thus be easily adjusted according to the condition of the engine to which the muffler is coupled. The muffler thus may be easily secured to various kinds of engines.

Figure 2:
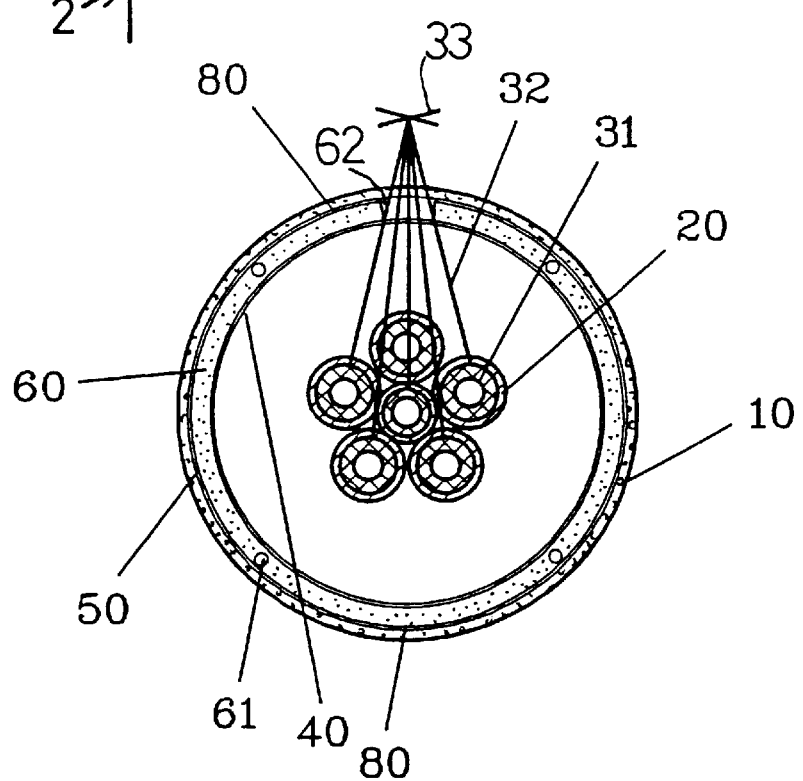
FIG. 2 is a cross sectional view taken along lines 2—2 of FIG. 1.
Figure 5:
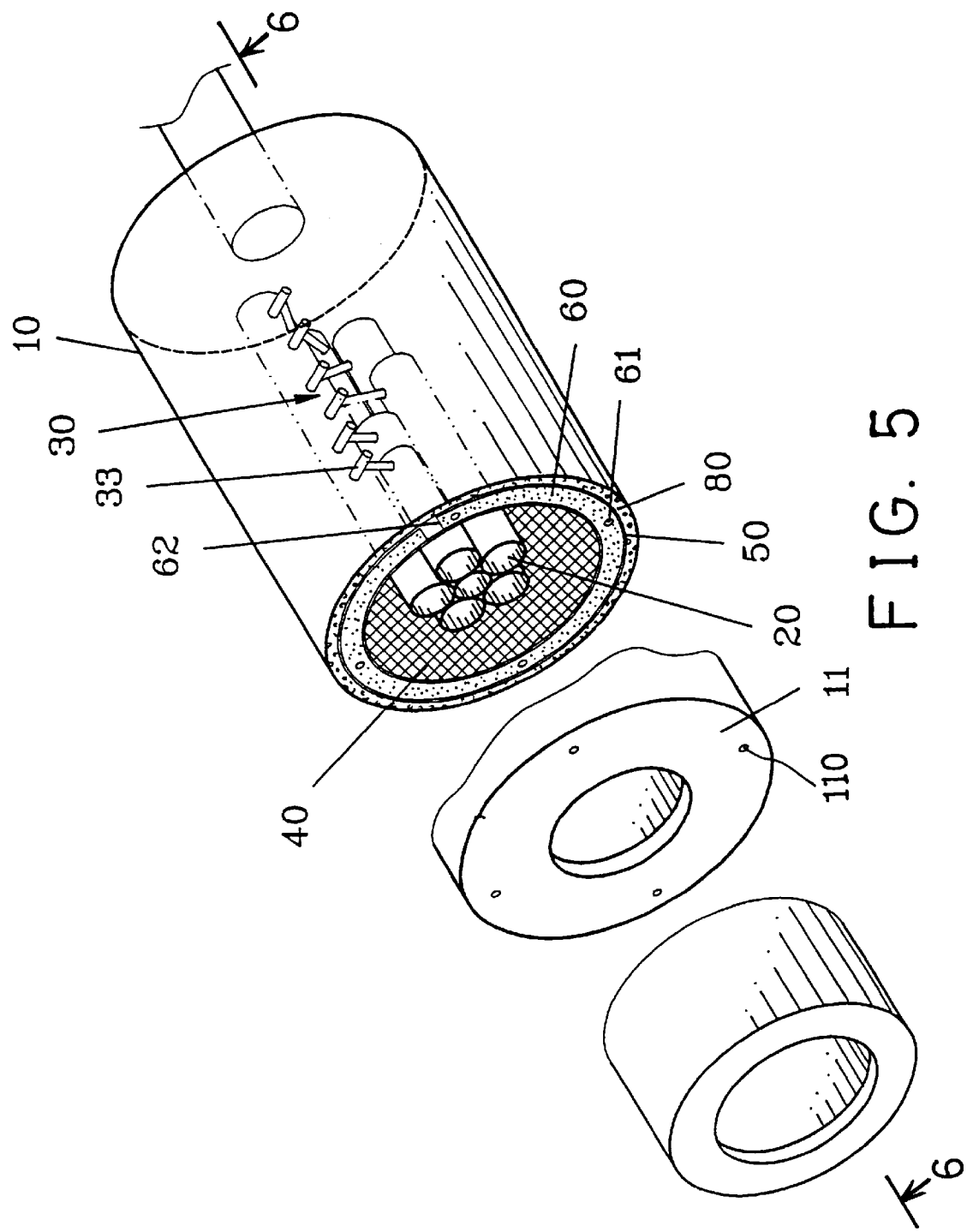
FIG. 5 is a perspective view of the muffler, in which a portion of the muffler is cut off for showing the interior of the muffler.
Figure 6:
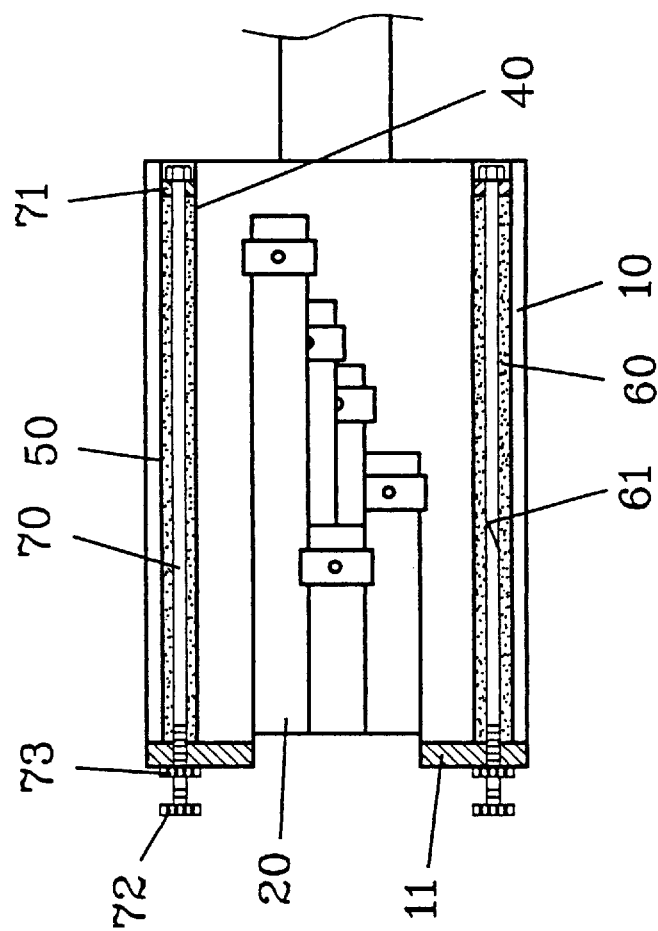
FIG. 6 is a partial cross sectional view taken along lines 6—6 of FIG. 5.

Referring next to FIGS. 5 and 6, and again to FIGS. 1 and 2, the housing 10 includes an end cap 11 secured to one end and having one or more screw holes 110 for threadedly engaging with bolts 72. Two cylindrical filters 40, 50 are secured in the housing 10. It is preferable that the filter 50 is disposed between the filter 40 and the housing 10 and is made of active carbon material. A filter material 80, such as carbon, spongy material, etc. is engaged between the filter 50 and the housing 10 for filtering the exhaust gas. Another filter material 60, particularly the spongy material, is disposed between the filters 40, 50, for absorbing the noise that may be generated by the muffler. A ring 71 is slidably engaged between the filters 40, 50 and is engaged with the bolts 72 such that the bolts 72 may force the ring 71 to move against or to squeeze the spongy material 60. When the spongy material 60 is squeezed, a portion of the exhaust gas may flow through the filters 40, 50 without flowing through the spongy material 60, such that the noise generated by the muffler may be adjusted by the ring 71 and the bolts 72. One or more nuts 73 are engaged with the bolts 72 for securing the bolts 72 and the ring 71 in place. The spongy material 60 preferably includes one or more apertures 61 (FIGS. 5, 6) for engaging with the bolts 72, and includes a slot 62 (FIG. 5) for engaging with the shafts 32 and for preventing the shafts 32 from affecting the squeeze of the spongy material 60.

Accordingly, the muffler in accordance with the present invention includes a device for adjusting the pressure in the muffler and includes a device for adjusting the noise that may be generated by the muffler.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A muffler comprising:

a housing, at least one tube secured in said housing and having a bore, and at least one valve member engaged in said at least one tube for adjusting an opening size of said bore of said at least one tube, said at least one valve member including a ball rotatably engaged in said at least one tube and having an orifice for aligning with said bore of said at least one tube and for adjusting the opening size of said bore when said ball is rotated.

2. The muffler according to claim 1, wherein said at least one valve member includes a shaft extended from said ball and a hand grip secured on said shaft for rotating said ball.

3. The muffler according to claim 2 further comprising a first cylindrical filter secured in said housing, a second cylindrical filter secured in said housing and located between said housing and said first cylindrical filter, a filter material engaged between said first and said second cylindrical filters for filtering an exhaust gas, and means for squeezing said filter material to allow a portion of the exhaust gas to flow through said first and said second cylindrical filters without flowing through said filter material.

4. The muffler according to claim 3, wherein said filter material is a spongy material having a slot for engaging with said shaft of said at least one valve member.

5. A muffler comprising:

a housing, a first cylindrical filter secured in said housing, a second cylindrical filter secured in said housing and located between said housing and said first cylindrical filter, a filter material engaged between said first and said second cylindrical filters for filtering an exhaust gas, and means for squeezing said filter material to allow a portion of the exhaust gas to flow through said first and said second cylindrical filters without flowing through said filter material.

6. The muffler according to claim 5, wherein said squeezing means includes a ring slidably engaged between said first and said second cylindrical filters, and means for moving said ring against said filter material and for squeezing said filter material.

7. The muffler according to claim 6, wherein said moving means includes at least one bolt threadedly engaged in said housing and threadedly engaged with said ring for allowing said at least one bolt to move said ring against said filter material.

8. The muffler according to claim 7, wherein said filter material includes at least one aperture for engaging with said at least one bolt.

* * * * *